US008273311B2

(12) United States Patent
Lee et al.

(10) Patent No.: US 8,273,311 B2
(45) Date of Patent: Sep. 25, 2012

(54) APPARATUS AND METHOD FOR SEPARATING BIOLOGICAL PARTICLES USING DIFFERENCE BETWEEN GRAVITY AND MAGNETIC FORCE

(75) Inventors: Kang Sun Lee, Incheon (KR); Ji Yoon Kang, Seoul (KR); Sung Shin Ryu, Namyangju (KR); In Hye Lee, Seoul (KR); Choong Kim, Namyangju (KR); Su Kyoung Chae, Jeonju (KR); Jin Woo Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 962 days.

(21) Appl. No.: 12/160,242

(22) PCT Filed: Jan. 11, 2007

(86) PCT No.: PCT/KR2007/000197

§ 371 (c)(1),
(2), (4) Date: Nov. 5, 2008

(87) PCT Pub. No.: WO2007/081161

PCT Pub. Date: Jul. 19, 2007

(65) Prior Publication Data

US 2009/0197329 A1 Aug. 6, 2009

(30) Foreign Application Priority Data

Jan. 11, 2006 (KR) ........................ 10-2006-0003260

(51) Int. Cl.
*B01D 21/00* (2006.01)

(52) U.S. Cl. ...................................................... 422/527

(58) Field of Classification Search ................... 422/527
See application file for complete search history.

(56) References Cited

U.S. PATENT DOCUMENTS

| | | | | |
|---|---|---|---|---|
| 5,602,042 | A | 2/1997 | Farber | |
| 5,968,820 | A | 10/1999 | Zborowski et al. | |
| 6,312,910 | B1 * | 11/2001 | Vellinger et al. ............. | 435/6.13 |
| 6,482,328 | B1 | 11/2002 | Davidson et al. | |
| 2005/0227349 | A1 | 10/2005 | Kim et al. | |

FOREIGN PATENT DOCUMENTS

| | | |
|---|---|---|
| KR | 10-2005-0100216 | 10/2005 |
| WO | WO 2006/091060 A1 | 8/2006 |

* cited by examiner

*Primary Examiner* — Lore Jarrett
(74) *Attorney, Agent, or Firm* — Merchant & Gould P.C.

(57) ABSTRACT

Disclosed is an apparatus and method for injecting liquid-drops of particle mixture liquid including a mixture of biological particles, affecting magnetic field, and having only positive particles, which are combined with magnetic responsive material, separated by magnetic force, and having negative particles, which are not combined with magnetic responsive material, precipitated by gravity.

10 Claims, 7 Drawing Sheets

【Figure 1】
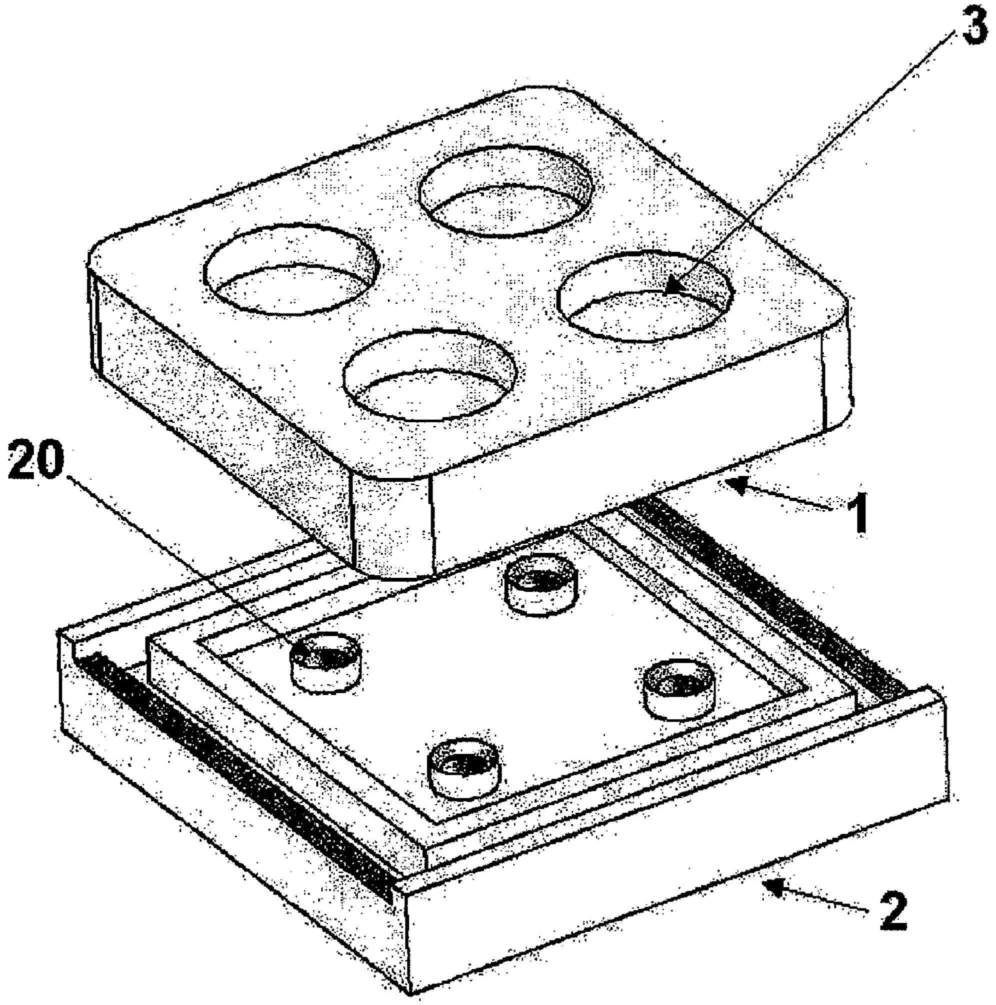

【Figure 2】
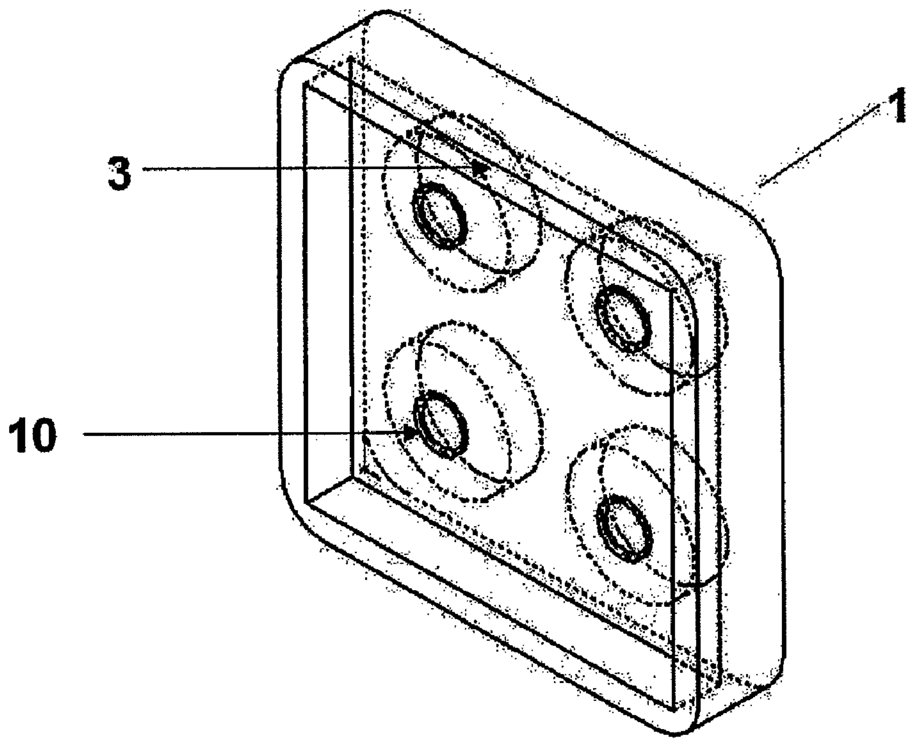
【Figure 3】
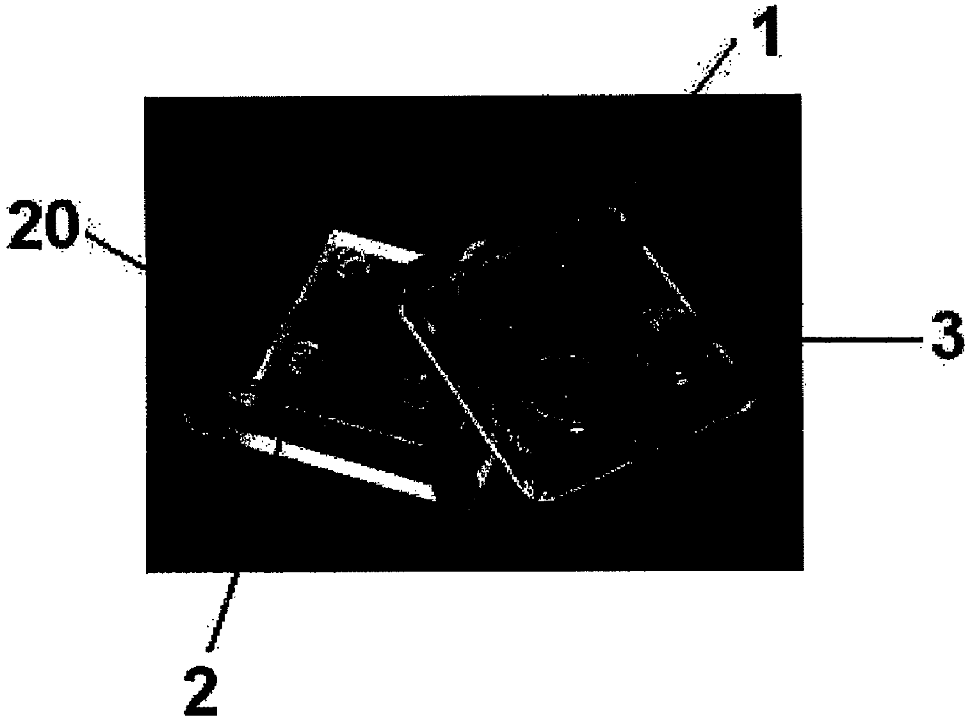

【Figure 4】
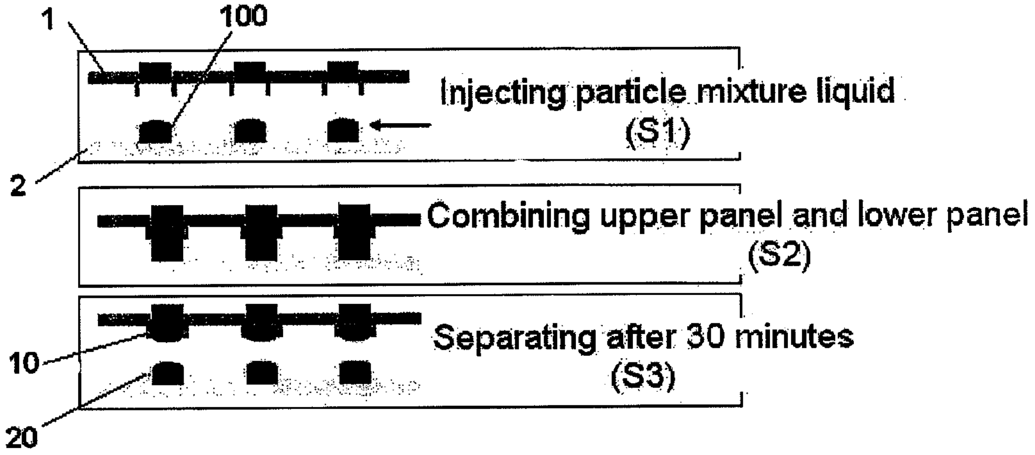
【Figure 5】
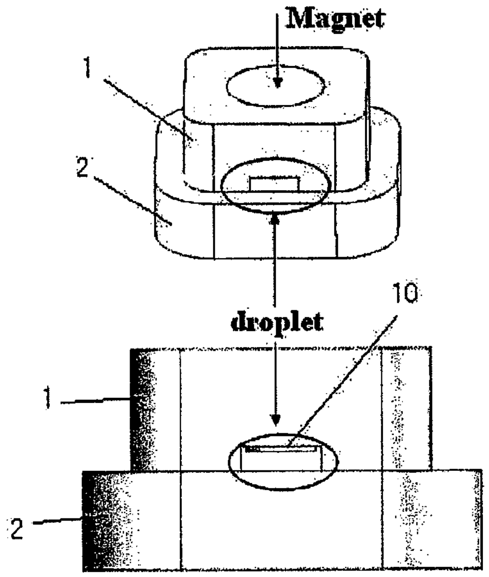

【Figure 6】
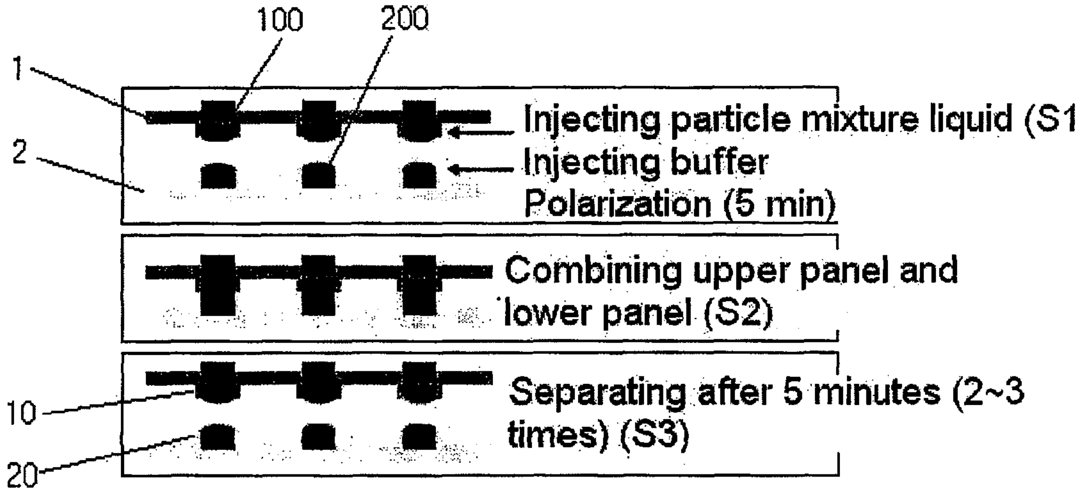

【Figure 7】
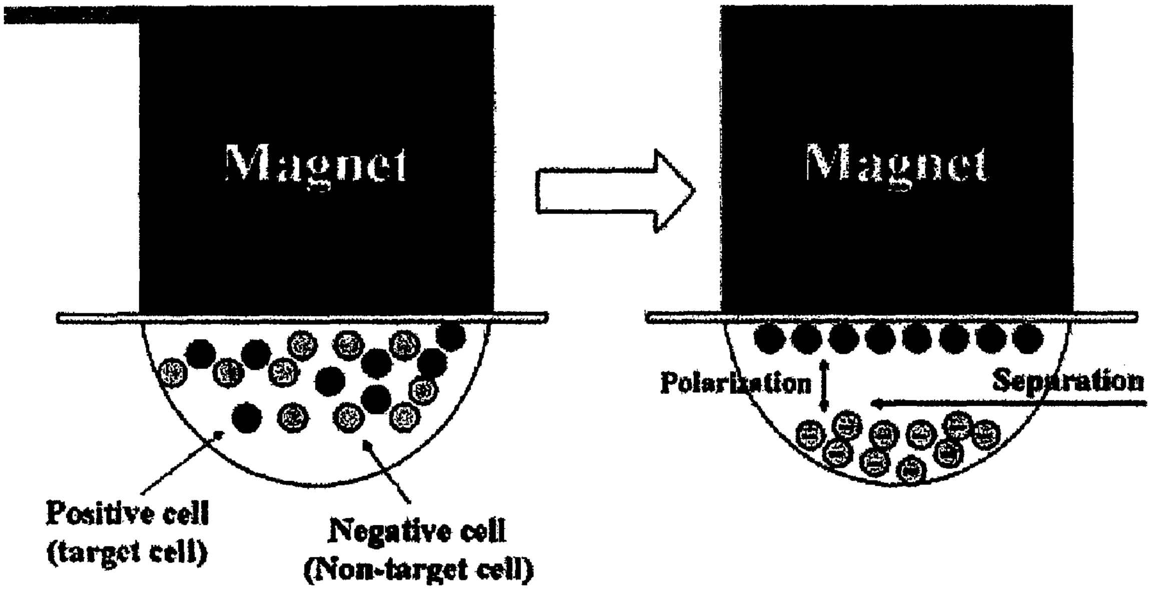

【Figure 8】
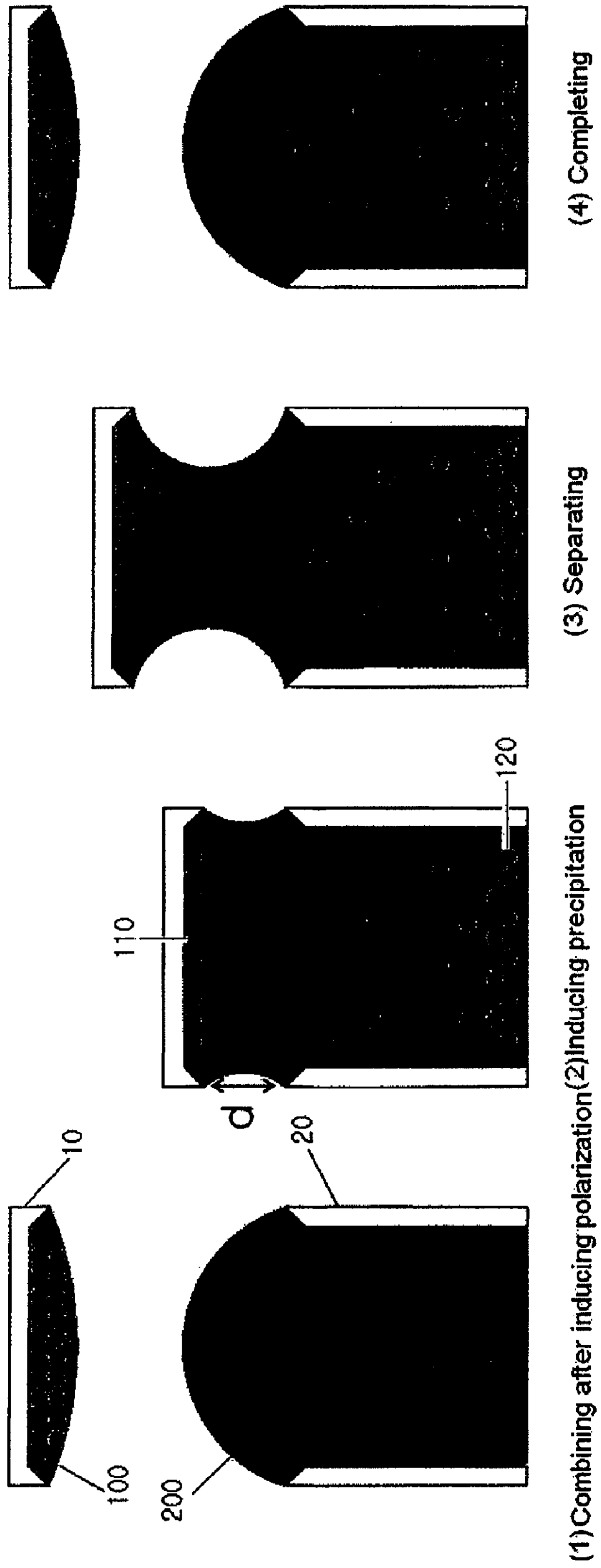

【Figure 9】
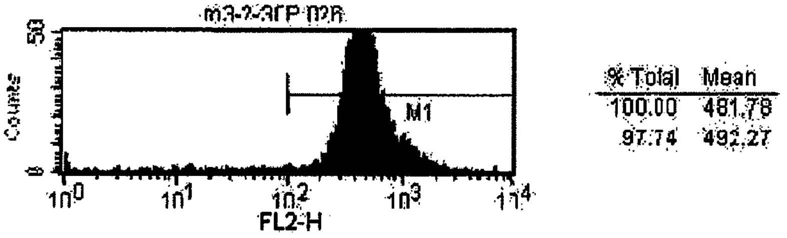
【Figure 10】
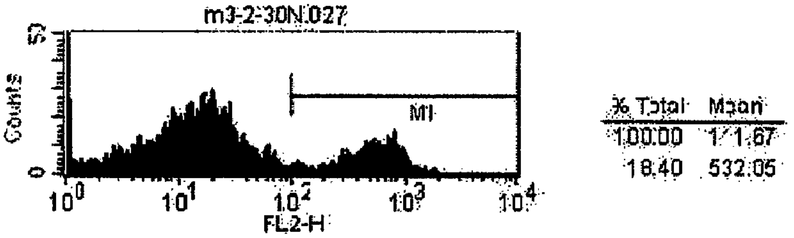
【Figure 11】
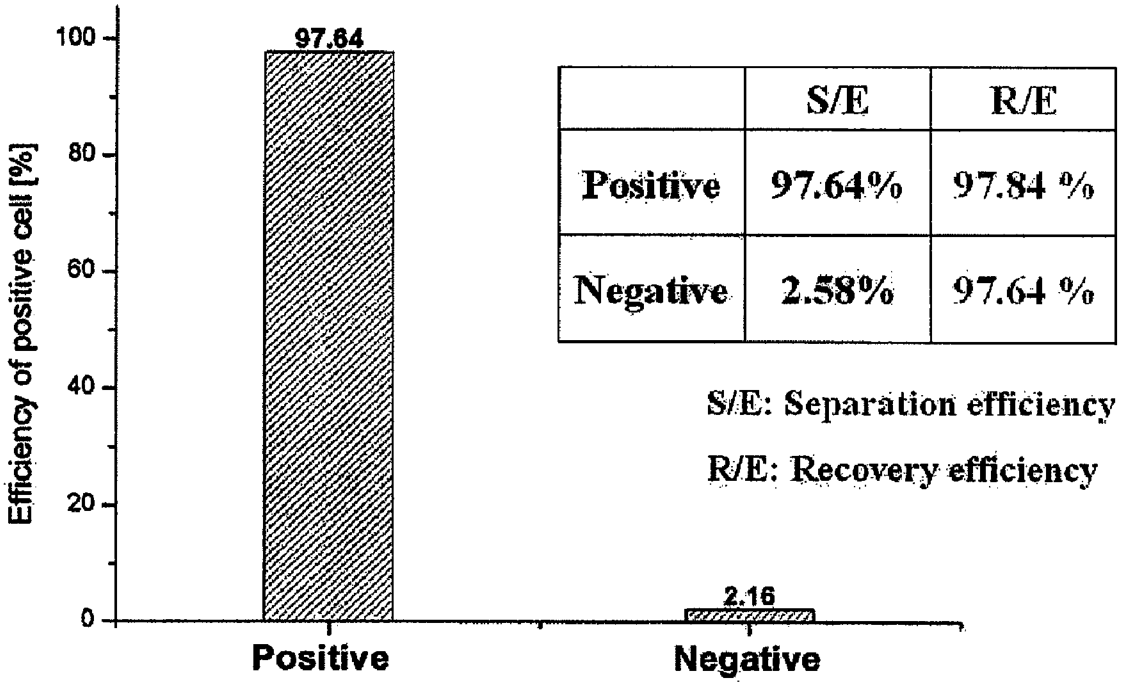

APPARATUS AND METHOD FOR SEPARATING BIOLOGICAL PARTICLES USING DIFFERENCE BETWEEN GRAVITY AND MAGNETIC FORCE

An apparatus and method for separating biological particles using difference between gravity and magnetic force

TECHNICAL FIELD

The invention relates to an apparatus and method for separating biological particles. More specifically it relates to an apparatus and method for injecting liquid-drops of particle mixture liquid including a mixture of biological particles, by affecting magnetic field, separating only positive particles combined with magnetic responsive material by magnetic force, and precipitating negative particles by gravity.

BACKGROUND ART

Conventional separation method for biological particles, particularly which is explained with cells, is as follows. Conventional cell separation methods comprising cell separation using the water-drop type cell suspension are divided into two kinds of ones. The first method is the separation method for cells by using a tube type cell separation apparatus using magnetic force and gravity, and the second one is the separation method using the size of minute tubes, which are the path for cell movement, and the size of cells to be separated.

First, the separation method for cells by using a injection-tube type cell separation apparatus using magnetic force and gravity accounts for 70 to 80 percent of cell separation method, presently performed worldwide. It functions by exercising magnetic field and injecting cell mixture liquid to the direction of gravity in the state that many iron balls of ferromagnetic material are included inside of the tube type cell separation apparatus. Where, as the positive cells to be separated from the cell mixture liquid are attached with magnetic bid by using an antigen-antibody reaction, the cells have a trait of being attached to surrounding magnetic material. If the cell mixture liquid is injected and magnetic filed is exercised, then the iron balls of ferromagnetic material become magnetic, and the specific cells magnetic bids are attached are attracted to the balls.

The method using the tube type cell separation apparatus using magnetic force and gravity uses iron balls with 50 to 100 [mu]m in diameter, as the size of air gap is different according to the size of iron balls, in order to separate positive cells with various size, there is a problem that the size of iron balls should be adjusted at every time. And, as the separation positive cells contact to iron balls directly, there is the possibility of cell loss and damage, and when the cells are injected in coagulation, as it is difficult for the cells to pass through air gap between iron balls, a process eliminating coagulated cells in advance by use of a sieve before separation is necessary.

Second, the separation method using the sizes of the minute tube for cell movement and positive cells to be separated is the one that specified cells move and are separated only through paths by forming the paths through which the mixture liquid is movable and by forming new path proper to specified cells in the end of the paths. According to the method, like the tube type cell separation apparatus using magnetic force and gravity, there is inconvenience to form new minute tube with new size and in case that smaller cells than the positive cell size are mixed, there is a difficulty of separating the positive cells all at once.

Finally, the cell separation method using suspension with form of water drop (Korean Patent Application No. 2004-25421), one of cell separation methods using magnetic force and gravity, is a method for separating only positive cells combined with magnetic bids by applying magnetic field at the state where a cell suspension with water-drop form is suspended down on the substrate. But, the method has problems that it needs a process of processing surface with hydrophilic and hydrophobic property and that the size and capacity of water drop are confined as it has a structure that water drops are hanged. And it has a defect that, as in order to form water drops, cell mixture liquid is injected directly into a water-drop type cell suspension formation part contacting a permanent magnet, and accordingly the method needs forming water drops and reversing the water-drop type cell suspension formation part, the water drops may be separated from the cell suspension formation part when rotating with the water-drop type cell suspension formation part.

DISCLOSURE

Technical Problem

One embodiment of the invention purports to solve the problems.

The object of another embodiment of the invention is to separate efficiently biological particles regardless the size of the particles.

The object of another embodiment of the invention is to separate biological particles efficiently without ferromagnetic materials and to reduce damages and losses of cells maximally.

The object of another embodiment of the invention is to suggest a separation apparatus and method which enable to separate cells efficiently by increasing through-puts and injecting cell mixture liquid stably by eliminating conventional defects, which are throughputs and the injection method of cell mixture liquid through structural modifications of an apparatus.

Technical Solution

The biological particle separation apparatus using difference between gravity and magnetic force according to the present invention characterized by being an apparatus having wanted positive particles separated from particle mixture liquid containing mixture of biological particles, comprising an upper panel containing a vessel which receives liquid-drops;

an lower panel containing a vessel which receives liquid-drops, which is situated at the lower side of the upper panel; and an magnetic field application part applying magnetic field, which is situated at the upper side of the upper panel, wherein the upper panel is situated so that the entrance of its vessel is directed downward, the lower panel is situated so that the entrance of its vessel is directed upward, and the entrances of the vessels in the upper panel and the lower panel are situated to the direction of facing each other mutually.

In the biological particle separation apparatus using difference between gravity and magnetic force according to an embodiment of the invention, the positive particles are preferably cells.

In the biological particle separation apparatus using difference between gravity and magnetic force according to an embodiment of the invention, the vessel is preferably cylindrical type.

In the biological particle separation apparatus using difference between gravity and magnetic force according to an embodiment of the invention, the height of the vessel of the upper panel is preferably 0.5 mm or less.

In the biological particle separation apparatus using difference between gravity and magnetic force according to an embodiment of the invention, the height of the vessel of the lower panel is preferably 10 mm or more.

In the biological particle separation apparatus using difference between gravity and magnetic force according an embodiment of the invention, the walls of the vessel entrances in the upper panel and lower panel are cut and declined toward inside.

The biological particle separation method using difference between gravity and magnetic force according to the present invention characterized by being a method of having wanted positive particles separated from particle mixture liquid containing mixture of biological particles, comprising the first step of combining magnetic reactive material only with positive particles among biological particles contained in the particle mixture liquid;

the second step of injecting liquid-drops of the particle mixture liquid into more than one vessel;

the third step of forming magnetic field inside of particle mixture liquid by applying magnetic field at the upper side of particle mixture liquid contained in the vessel;

the fourth step of collecting positive particles being moved upward toward the direction of the magnetic force by the magnetic field and negative particles being moved downward toward the direction of gravity collected respectively.

In the biological particle separation method using difference between gravity and magnetic force according an embodiment of the invention, the method is preferably performed by using the biological particle separation apparatus using difference between gravity and magnetic force as above.

In the biological particle separation method using difference between gravity and magnetic force according to an embodiment of the invention, the second step is preferably to inject liquid-drops of the particle mixture liquid into the vessels of any one of the upper panel and lower panel.

In the biological particle separation method using difference between gravity and magnetic force according to an embodiment of the invention, comprising, after injecting the liquid-drop of particle mixture liquid into the vessel of the lower panel, having liquid-drops of the particle mixture liquid contacted to the vessel inside of the upper panel by reducing the gap between the vessels of the upper panel and the lower panel, and having the upper panel and lower panel returned to the original position.

In the biological particle separation method using difference between gravity and magnetic force according to an embodiment of the invention, the buffer solution is injected into the panel in which liquid-drops of particle mixture liquid are not injected in the second step.

In the biological particle separation method using difference between gravity and magnetic force according to an embodiment of the invention, the liquid-drops of particle mixture liquid are injected into the vessel of the upper panel in suspended state, and buffer solution is injected into the vessel of the lower panel.

In the biological particle separation method using difference between gravity and magnetic force according to an embodiment of the invention, the second step is characterized by injecting the liquid-drops of particle mixture solution into the vessel of the upper panel in suspended state, the third step is characterized by having the upper panel polarized by applying magnetic field to the panel and the fourth step is characterized by having liquid-drops of the particle mixture liquid contacted to the buffer solution by reducing the gap between the vessels of the upper panel and the lower panel, and having the upper panel and lower panel returned to the original position after time has passed.

In the biological particle separation method using difference between gravity and magnetic force according to an embodiment of the invention, the vessel is cylindrical and the diameter of a water drop is decided according to the diameter of the cylindrical vessel.

In the biological particle separation method using difference between gravity and magnetic force according to an embodiment of the invention, the positive particles are preferably cells.

In the biological particle separation method using difference between gravity and magnetic force according to an embodiment of the invention, the magnetic reactive material is preferably a magnetic bid.

In the biological particle separation method using difference between gravity and magnetic force according to an embodiment of the invention, the fourth step is characterized by repeating more than twice the process of reducing the gap between the vessel of the upper panel and the lower panel and returning the gap to be its original position.

In the biological particle separation method using difference between gravity and magnetic force according to an embodiment of the invention, in the fourth step, the gap is narrowed to be 2 to 3 mm when the gap between the vessel of the upper panel and lower panel is reduced.

The "biological particles" in the specification comprises cells, micoplasma, virus and all the particles to be able to combine with antibody. The "cell" in the specification includes biological cells from all origins including prokaryote and eukaryote.

The "mixture liquid" in the specification comprises all liquid sample such as serum, urine, water-solution or tap water, etc. Furthermore, the term comprises more thick liquid sample such as diluted feces or bone-marrow slurry. And, it may be a buffer including floating biological particles.

The "positive particle" in the specification means the particles to get finally through separation of mixture liquid.

The "negative particles" in the specification mean the other particles except for object particles in mixture liquid.

Advantageous Effects

According to the biological particle separation apparatus and method using difference between gravity and magnetic force according to one embodiment of the invention, as the method doesn't use minute tubes or iron balls, absorbing problem can be minimized, the size of the cell separation apparatus according to the size of object particles don't have to be adjusted, even though the amount of cell mixture liquid is so little as to tens of micro litter, the particles can be separated, the whole size of the apparatus can be small as the apparatus uses cell liquid in form of water-drop. In addition, a loss due to evaporation can be reduced because the separation is performed inside of receptacle, and a large amount and a variety of biological cells can be processed in a quick time.

DESCRIPTION OF DRAWINGS

FIG. 1 is a brief drawing that depicts the separation apparatus according to the first embodiment of the invention.

FIG. 2 is a perspective drawing that depicts the upper panel in the separation apparatus according to the first embodiment of the invention.

FIG. 3 is a picture of the separation apparatus according to the first embodiment of the invention.

FIG. 4 is a process drawing depicting the separation method according to the first embodiment of the invention.

FIG. 5 is a brief drawing depicting the separation apparatus according to the first embodiment of the invention.

FIG. 6 is a process drawing depicting the separation method according to the second embodiment of the invention.

FIG. 7 is a process drawing depicting the principle of the separation method according to the invention.

FIG. 8 is a process drawing depicting the separation method according to the second embodiment of the invention.

FIG. 9 and FIG. 10 are graphs depicting the results of performing the separation method according to the first embodiment of the invention.

FIG. 11 is a graph depicting the result of performing the separation method according to the second embodiment of the invention.

BEST MODE

Hereafter, the invention will be explained in detail with attached drawings, but it is manifest that the scope of the invention is not confined to the explanation.

FIG. 7 is a concept drawing depicting the principle of the separation method according to the invention.

When magnetic field is applied by the magnetic field application part (3), positive cells combined with magnetic reactive material will be moved to the upper direction, negative cells not combined with magnetic reactive material are not affected by magnetic field and just moved to the downward direction, the direction of gravity, by gravity. By this, just positive particles moved and gathered to upper direction can be separated.

Hereafter, the particle separation method according to a preferred embodiment of the invention will be explained.

The First Embodiment

The embodiment is to separate positive particles by using the separation apparatus depicted in FIG. 1 and FIG. 3. As depicted in FIG. 4, after injecting particle mixture liquid (100) including biological particles into the vessel of the lower panel (2) (S1), the upper panel (1) and the lower panel (2) are connected, thereby narrowing the gap between the vessel (10) of the upper panel (1) and the vessel (20) of the lower panel (2). As a result, the particle mixture liquid within the vessel (20) of the lower panel (2) is contacted to the inside surface of the vessel (10) of the upper panel (2). Like this, when having the upper panel (1) and the lower panel (2) combined, particles combined with magnetic bid in particle mixture liquid move upward by magnetic field formed by the magnetic field application part (3), negative particles will be precipitated downward by gravity. After an amount of time has passed, positive particles and negative particles can be gathered by separating the upper panel (1) and lower panel (2). The separation apparatus uses the phenomenon that when particle mixture liquid, where positive particles to be separated is mixed with negative particles, is injected, liquid-drops of the particle mixture liquid (100) is formed in the vessel (20) of the lower panel (2), that is, particle mixture liquid with form of water-drop is formed by surface tension.

The separation apparatus uses the phenomenon that when particle mixture liquid, where positive particles to be separated is mixed with negative particles, is injected, liquid-drops of the particle mixture liquid (100) is formed in the vessel (20) of the lower panel (2), that is, particle mixture liquid with form of water-drop is formed by surface tension.

The vessels (10, 20) are preferably cylindrical type ones whose insides are empty. The vessels can be several. The size and capacity of the particle mixture liquid droplet can be adjusted according to the size and structure of the vessel. For example, in order to form liquid-drops of particle mixture liquid with the diameter of about 7 mm, liquid-drops of particle mixture liquid with the diameter of about 7 mm can be made by fabricating the cylindrical vessel with the diameter of about 7 mm and injecting particle mixture liquid.

When the vessel (10) of the upper panel (1) is cylindrical, as surface contacting with water-drops is larger and thus surface tension is larger, positive particles can be separated and gathered stably by attaching water-drops stably. Through this structure, even if the diameter of a water-drop exceeds 10 mm, water-drop can be carried steadily.

FIG. 4 depicts the state where the upper panel (1) and lower panel (2) are combined. The upper panel (10) with cylindrical type and the lower panel (20) also with cylindrical type are facing and approached. Particle mixture liquid soars upward convexly higher than the height of the vessel (20) when water-drop of particle mixture liquid is injected into the vessel (20). When the upper panel (1) and the lower panel (2) is combined, the droplet which soars upward convexly contacts the vessel (10) of the upper panel (1). The upper panel (1) and lower panel (2) are separated after positive particles and negative particles have moved to upside and downside respectively, the upper part of water-drops comprising positive particles moved to the upper part by magnetic field is separated in the state of being attached to the vessel (10) of the upper panel (1).

It is preferable for the diameter of the upper panel (10) to be designed to be the same as that of the lower panel (20). The height of the upper panel (10) is preferred to be 3 mm or less. If the height exceeds 3 mm, it is difficult for liquid-drops to contact to all surfaces inside of the vessel (10) of the upper panel (1). It is because water-drops can contact to all surfaces inside of the upper vessel (10) only if that they are protruded to the height of 3 mm or higher, but it is not easy for the height of liquid-drops to exceed 3 mm. That is, in order for the droplet to contact to all surfaces inside of the upper vessel (10), the height of the upper vessel (10) is preferable to be 3 mm or less. For this respect, it is much preferable to be 1 mm or less. Even though there is no special restriction on the lower limit of the height of the upper vessel (10), it would be 0.1 mm or more to carry water-drops stably.

The lower panel vessel (20) is preferable to be 5.5 mm to 9.5 mm. It is because, if the height is less than 5.5 mm, throughput of cell separation is minute, and if the height is more than 9.5 mm, separation efficiency would drop since separation time increases and there is the space not being affected by magnetic field because the distance that positive particles should move is too long.

The means injecting the particle mixture liquid into the lower panel vessel (20) can be a pipette. The magnetic field applying part (3) can be a permanent magnet, magnetic material having magnetic field by application of external magnetic field, an electric magnet, or can be implemented by other means by necessity. The magnetic field application part (3) can be connected to the upper panel (1), not fixed but to be separated easily. The number of the magnetic field application part (3), as depicted in FIG. 1, can be designed to be the same as the number of the lower panel (20). A separation apparatus can be formed including several units composed of a lower panel vessel (20), a upper panel vessel (10) and a magnetic field application part (3) by matching the lower panel vessels (20), the lower panel vessels and the magnetic field application parts with corresponding positions.

When the upper panel vessel (10) contacts to liquid-drops contained inside of the lower panel vessel (20), the shape of water-drops is transformed as shown in S2 of FIG. 4. The cells combined with magnetic bids by magnetic force move upward, other cells are precipitated. Then, by separating the upper panel (1) and the lower panel (2), positive cells and negative cells can be separated. The positive cells attached to the upper panel vessel (10) can be gathered by a pipette, etc.

And, the upper panel vessel (10) and the lower panel vessel (20) may perform the function of preventing the evaporation of the particle mixture liquid. More specifically, as liquid-drops are enclosed by the upper panel vessel (10) and the lower panel vessel (20), exposed part to outside is just distance between the upper panel vessel (10) and the lower panel vessel (20), evaporation of water-drops can be reduced remarkably.

Strength of magnetic field should be about a magnitude of overcoming gravity exercising positive particles combined with the magnetic responsive material. If, after collecting positive particles in the state of being connected with the upper panel vessel (10), magnetic field is eliminated, then positive particles can be separated from the upper panel vessel (10). Inside of liquid-drop of the particle mixture liquid, there can be positive particles, some amount of water-solution and other particles. The positive particles are preferable to be connected with magnetic responsive material by use of antigen-antibody reaction.

There are positive particles inside of the upper panel vessel (10) and negative particles inside of the lower panel vessel (20). The separated positive and negative particles can be collected respectively by separating the upper panel (1) and the lower panel (2).

The Second Embodiment

The following is an explanation about a separation method according to another embodiment of the invention.

Positive particles can be separated according to the procedures of FIG. 6 and FIG. 8 using the apparatus of FIG. 5.

In the embodiment, unlike the first embodiment, particle mixture liquid (100) is injected in the upper panel vessel (10) and buffer solution (200) is injected in the lower panel vessel (20). Magnetic field is applied on the particle mixture liquid (100) within the upper panel vessel (10) by the magnetic field applying part (3) positioned on the upper panel vessel (10) and then the liquid is polarized by positive particles (110) combined with magnetic material and negative particles (120) not combined with magnetic material.

5 minutes or more are preferable for polarization. When combining the upper panel (1) and the lower panel (2) after polarization, the distance (d) between the upper panel vessel (10) and the lower panel vessel (20) is closer, then particle mixture liquid (100) in the upper panel vessel (10) and buffer solution (200) in the lower panel vessel (20) contact with each other. When the particle mixture liquid (100) and the buffer solution (200) contact with each other, negative particles (120) not combined with magnetic material will be precipitating gradually while positive particles (110) combined with magnetic material is attached to the upper panel vessel (10) by magnetic force. When the upper panel (1) and the lower panel (2) are separated after about 5 minutes have passed, there exist only positive particles (110) in the upper panel vessel (10), and negative particles (120) in the lower panel vessel (20).

If the combination and separation procedure of the upper panel (1) and the lower panel (2) are repeated twice or more, separation efficiency can be enhanced. Preferably, the combination and separation procedure of the upper panel (1) and the lower panel (2) are performed twice or three times.

In the embodiment, the buffer solution (200) has a role of maintaining the shape of water-drops more stably.

Preferably, as depicted in FIG. 8, walls of the entry part of the upper panel vessel (10) and the lower panel vessel (20) are cut to be declined to the inward direction. By this structure, formation of water-drops is more stable and negative cell loss can be reduced remarkably.

In the embodiment, the height of the vessel (10) of the upper panel (1) is preferable to be 0.5 mm or less. Negative particles (120) having existed when particle mixture liquid (100) and buffer solution (200) are combined are not precipitated stably, but exit in floating state. Where, if the height of the upper vessel (10) exceeds 0.5 mm, there is a risk that negative particles (120) floating may follow up to the upper panel (1). Therefore, in order that the minimum amount of buffer solution (200) follows up to the upper panel (1), the height of the upper panel vessel (10) is preferably 0.5 mm or less. The lower limit of the height of the upper panel vessel (10) is not limited so long as particle mixture liquid (100) can be contained.

Meanwhile, the height of the lower panel vessel (20) is preferable to be 10 mm or more. More than 10 mm gives stable result considering that shocks from outside or other external stimuli. The maximum height of the lower panel vessel (20) is preferable to be 20 mm or less, though not especially limited. It is because a tool to be used when injecting solution is usually a pipette, when injecting and removing the solution by using the pipette, if the height (depth) is too high, a user can be inconvenient and buffer solution can be consumed excessively.

In FIG. 8, "d" represents a gap between the upper panel vessel (10) and the lower panel vessel (20) when the upper panel (1) and the lower panel are combined.

The gap between the upper panel vessel (10) and the lower panel vessel (20) is preferable to be 2 to 3 mm. If the gap is less than 2 mm, when the upper panel (1) and the lower panel (2) are separated, positive particles (110) in particle mixture liquid (100) can be swept away to the lower panel vessel (20). More specifically, when the upper panel (1) and the lower panel (2) are separated from each other, water-drops droops upwards and downwards, where a considerable amount of positive particles (110) get floated in the upper panel vessel (10) by flowing. If there is no gap or just narrow gap, the positive particles floating in the upper panel vessel (10) will move to the lower panel vessel (20). It downgrades not only the rate of retrieval of positive particles (110), but also the retrieval rate of negative particles (120). If the gap exceeds 3 mm, then separation efficiency can be deteriorated as the mixture liquid (100) and the buffer solution (200) cannot contact enough with each other.

The number of cells, positive particles, are $10^7$ or more, separation efficiency can be enhanced if, after performing the procedure of FIG. 8, pumping solution collected in the upper panel (1) by a pipette, the procedure of FIG. 8 is repeated once or twice again.

The magnetic field applying part (3) can be a permanent magnet, magnetic material having magnetic field by application of external magnetic field, an electric magnet, or can be implemented by other means by necessity. The magnetic field application part (3) can be connected to the upper panel (1), not fixed but to be separated easily. The number of the magnetic field application part (3), as depicted in FIG. 1, can be designed to be the same as the number of the lower panel (20). A separation apparatus can be formed including several units composed of a lower panel vessel (20), a upper panel vessel (10) and a magnetic field application part (3) by matching the upper panel vessels (10), the lower panel vessels (20) and the magnetic field application parts (13) with corresponding positions.

And, the upper panel vessel (10) and the lower panel vessel (20) may perform the function of preventing the evaporation of the particle mixture liquid. More specifically, as liquid-drops are enclosed by the upper panel vessel (10) and the lower panel vessel (20), exposed part to outside is just distance between the upper panel vessel (10) and the lower panel vessel (20), evaporation of water-drops can be reduced remarkably.

Strength of magnetic field should be about a magnitude of overcoming gravity exercising positive particles combined with the magnetic responsive material. If, after collecting positive particles in the state of being connected with the upper panel vessel (10), magnetic field is eliminated, then positive particles can be separated from the upper panel vessel (10). Inside of liquid-drop of the particle mixture liquid, there can be positive particles, some amount of water-solution and other particles. The positive particles are preferable to be connected with magnetic responsive material by use of antigen-antibody reaction.

MODE FOR INVENTION

Hereafter, to provide evidences for utility of the cell separation apparatus and method according to the invention, an explanation about an experimental result, where cells are actually separated by use of the cell separation apparatus and method according to the invention.

Experiment 1

Separation and washing processes for $1\times10^6$ bone marrow cells extracted from a mouse (3 weeks old, female) are repeated twice for 3 minutes at 4000 rpm by using a centrifugal separator. And after mixing Biotin-anti-mouse TER-119 and erythiod cells (Ly-76) in proportion of 1:250, they were reacted for 10 minutes. Separation and washing processes are repeated twice for 3 minutes at 4000 rpm by using a centrifugal separator. To attach second antigens to the washed cells, they were reacted for 15 minutes after mixing cell and magnetic bid (Texas Red) in proportion of 160:40. Then, after washing, a preparation of a living body sample for experiment is completed.

The PBS buffer solution containing $1\times10^4$ bone marrow cells to which magnetic bids are attached is injected in the lower panel vessel (20) (diameter: 7 mm, height 5.5 mm) according to the embodiment of the invention depicted in FIG. 1 and FIG. 3 and the upper panel (1) and the lower panel (2) are connected.

After 30 minutes has passed, the upper panel (1) and the lower panel (2) are separated and cells are collected from the upper panel vessel (10) by a pipette.

The results are depicted in FIG. 9 and FIG. 10. FIG. 9 and FIG. 10 are data obtained by analyzing using a FACS (Fluorescence activated cell sorter) bio-samples collected after above separation experiment.

FIG. 9 illustrates the separation efficiency of positive cells, and it shows that 97.74% of the cells collected is constituted of the wanted bone marrow. It is a yield much higher than that of conventional commercial products. FIG. 10 is a content rate contained in solution collected by the lower panel vessel (20), and it shows the liquid contains about 18.4% of positive cells as the result of experiment. As it is more important to collect positive cells more purely, the result shows the applicability of the separation apparatus and method according to the invention.

Result of Experiment 2

By using the same method as experiment 1, magnetic bids (Texas RED) (Abcam., http://www.abcam.com/) are attached to Jurket cells (Abcam.). Jurket cells to which magnetic bids are attached and Jurket cells to which magnetic bid is not attached are mixed in 5:5.

In PBS buffer solution containing the cell mixture where the number of cells is $1\times10^7$, cells are separated according to FIG. 6 and FIG. 8 using the apparatus depicted in FIG. 5. More specifically, the PBS buffer solution containing cell mixture of $1\times10^7$ cells is injected in the upper panel vessel (10) (diameter: 6 mm, height 0.5 mm) by a pipette and PBS buffer solution is injected in the lower panel vessel (20) (diameter: 6 mm, height: 10 mm). Then the upper panel (1) and the lower panel (2) are connected.

After 5 minutes has passed, the upper panel (1) and the lower panel (2) are separated and cells are collected from the upper panel vessel (10) and the lower panel vessel (20), respectively by a pipette.

Separation efficiency can be represented by following 4 references.

(1) positive: separation efficiency=X1(X1+Y1)

(2) negative: separation efficiency=X2(X2+Y2)

(3) positive: recovery efficiency=X1/(X1+X2)

(4) negative: recovery efficiency=Y2/(Y1+Y2)

where,

X1 is the number of positive cells contained in the upper panel (1)

Y1 is the number of negative cells contained in the upper panel (1)

X2 is the number of positive cells contained in the lower panel (2)

Y2 is the number of negative cells contained in the lower panel (2).

The results are, as shown in FIG. 11, more than 97% of separation efficiency and more than 97% of recovery efficiency for positive cells.

INDUSTRIAL APPLICABILITY

According to the biological particle separation apparatus and method using difference between gravity and magnetic force according to one embodiment of the invention, as the method does not use minute tubes or iron balls, absorbing problem can be minimized, the size of the cell separation apparatus according to the size of object particles do not have to be adjusted, even though the amount of cell mixture liquid is so little as to tens of micro litter, the particles can be separated, the whole size of the apparatus can be small as the apparatus uses cell liquid in form of water-drop. In addition, a loss due to evaporation can be reduced because the separation is performed inside of receptacle, and a large amount and a variety of biological cells can be processed in a quick time.

The invention claimed is:

1. A biological particle separation method for separating wanted positive particles from particle mixture liquid containing mixture of biological particles, comprising:

a first step of combining magnetic reactive material only with positive particles among biological particles contained in the particle mixture liquid;

a second step of injecting liquid-drops of the particle mixture liquid into a vessel;

a third step of forming magnetic field inside of particle mixture liquid by applying magnetic field above the particle mixture liquid contained in the vessel; and a fourth step of collecting positive particles being moved upward toward a direction of the magnetic force by the magnetic field and negative particles being moved downward toward a direction of gravity collected respectively, wherein the method uses a biological particle separation apparatus comprising an upper panel containing a vessel which receives liquid-drops, a lower panel containing a vessel which receives liquid-drops, wherein the lower panel is situated below the upper panel; and a magnetic field application part applying magnetic field, which is situated above the upper panel, wherein the upper panel is situated so that an entrance of its vessel is directed downward, the lower panel is situated so that an entrance of its vessel is directed upward, and the entrances of the vessels in the upper panel and the lower panel are situated to the direction of facing each other mutually, wherein the method further comprises, after injecting the liquid-drops of particle mixture liquid into the vessel of the upper panel or the lower panel, having liquid-drops of the particle mixture liquid contacted to the inside of the vessel of the upper panel or lower panel by moving the upper panel and the lower panel in a vertical direction to reduce a gap between the vessel of the upper panel and the vessel of the lower panel, and having the upper panel and lower panel returned to original positions, and wherein, in the second step, the vessel is any one of the vessel of the upper panel and the vessel of the lower panel.

2. The method according to claim 1, wherein buffer solution is injected into the vessel of the panel in which liquid-drops of particle mixture liquid are not injected in the second step.

3. The method according to claim 1, wherein liquid-drops of particle mixture liquid are injected into the vessel of the upper panel in a suspended state, and buffer solution is injected into the vessel of the lower panel.

4. The method according to claim 3, wherein the second step is characterized by injecting the liquid-drops of particle mixture solution into the vessel of the upper panel in a suspended state, the third step is characterized by having the upper panel polarized by applying magnetic field to the panel and the fourth step is characterized by having liquid-drops of the particle mixture liquid contacted to the buffer solution by reducing the gap between the vessel of the upper panel and the vessel of the lower panel, and having the upper panel and lower panel returned to original positions after time has passed.

5. The method according to claim 4, wherein the fourth step is characterized by repeating more than twice the process of reducing the gap between the vessel of the upper panel and the vessel of the lower panel and returning the panels to their original positions.

6. The method according to claim 4, the fourth step, wherein the gap is narrowed to be 2 to 3 mm when the gap between the vessel of the upper panel and lower panel is reduced.

7. The method according to claim 4, wherein a height of the vessel of the upper panel is 0.5 mm or less.

8. The method according to claim 4, wherein a height of the vessel of the lower panel is 10 mm or more.

9. The method according to claim 1, wherein the positive particles are cells.

10. The method according to claim 1, wherein the magnetic reactive material is magnetic bead.

* * * * *